United States Patent [19]
Carruthers et al.

[11] Patent Number: 5,574,739
[45] Date of Patent: Nov. 12, 1996

[54] POLARIZATION-STABLE PULSED LASER

[75] Inventors: Thomas F. Carruthers, Laurel, Md.; Irl N. Duling, III, Round Hill; Michael L. Dennis, Alexandria, both of Va.

[73] Assignee: The United States of America as represented by the Secretary of the Navy, Washington, D.C.

[21] Appl. No.: 440,020

[22] Filed: May 12, 1995

[51] Int. Cl.$^6$ ................................................ H01S 3/13
[52] U.S. Cl. .............................. 372/29; 372/6; 372/18; 372/106
[58] Field of Search ........................... 372/6, 18, 29, 372/27, 94, 106

[56] References Cited

U.S. PATENT DOCUMENTS

| | | | |
|---|---|---|---|
| 5,050,183 | 9/1991 | Duling, III | 372/94 |
| 5,359,612 | 10/1994 | Dennis et al. | 372/18 |
| 5,440,573 | 8/1995 | Fermann | 372/29 |
| 5,448,579 | 9/1995 | Chang et al. | 372/6 |

OTHER PUBLICATIONS

I. N. Duling III, "Subpicosecond All–Fibre Erbium Laser," Electron. Lett., Mar. 1991, 27, pp. 544–545.
I. N. Duling III and R. D. Esman, "Single–polarization Fiber Amplifier," Electron, Lett., Jun. 1992, 28, pp. 1126–1127.
M. E. Fermann et al., "Passive Mode Locking by Using Nonlinear Polarization Evolution in a Polizaration Maintaining Erbium–Doped Fiber," Opt. Lett., Jun. 1993, 18, pp. 894–896.
L. M. Yang et al., "Environmentally Stable Kerr–Type Mode–Locked Erbium Laser Producing 360–fs Pulses," Opt. Lett., Jan. 1994, 19, pp. 43–45.
Thomas Carruthers, et al, "Active–Passive mode Locking in a Single–Polarization Erbium Fiber Laser" Electron, Lett., Jun. 1994.

*Primary Examiner*—Rodney B. Bovernick
*Assistant Examiner*—Robert E. Wise
*Attorney, Agent, or Firm*—Thomas E. McDonnell; Daniel Kalish

[57] ABSTRACT

A pulsed laser includes a polarization section having a port, the polarization section being for receiving light at the port in a selected state of polarization and for outputting light at the port having a state of polarization orthogonal to the selected state of polarization. The laser also includes an amplifying section having a port, a bidirectional amplifier, and a rotator-reflector, the amplifying section being for receiving light at the amplifying section port and for outputting light at the amplifying section port amplified with respect thereto, the bidirectional amplifier being operatively coupled to the amplifying section port at a first end and operatively coupled to the rotator-reflector at a second end. The pulsed laser further includes means for transmitting light in both directions between the polarization section port and the amplifying section port, an amplitude modulator responsive to a modulation signal for actively mode-locking light internal to the pulsed laser, and means responsive to light internal to the polarization section for outputting coherent light.

3 Claims, 9 Drawing Sheets

POLARIZATION-STABLE PULSED LASER

FIELD OF THE INVENTION

This invention relates generally to coherent light generators, and more particularly to pulsed lasers for producing light having a stable polarization state.

BACKGROUND OF THE INVENTION

Solid state optical fiber amplifiers, such as erbium-doped material, have advantages as gain media for use in lasers. A fiber pulsed laser with subpicosecond pulses would be useful in high speed communications systems.

However, optical fibers have shortcomings due to fiber birefringence. Except for expensive polarization-maintaining or single-polarization fibers, optical fibers modify the state of polarization of light passing through them because of physical irregularity, thermal or mechanical stress, or other environmental factors. This birefringence is typically time-varying and unpredictable. As a result of such birefringence, fiber lasers, such as ring fiber lasers, are unstable in terms of frequency, polarization, amplitude, or power, unless they use extremely expensive and rare polarization-maintaining or single-polarization fibers. Fiber lasers are adversely affected by polarization-mode competition, polarization-mode dispersion, and polarization gain dependence and may manifest mode hopping and polarization instability. Furthermore, multiple pass fiber lasers producing standing waves are adversely affected by spatial hole burning resulting in mode hopping and mode instability.

Various mode-locked fiber lasers have been proposed for producing externally timed pulses. Because of the above-discussed fiber birefringence, such lasers are typically not polarization stable.

U.S. Pat. No. 5,303,314 to Irl. N. Duling, III et al., U.S. patent application filed Apr. 28, 1995 by Ronald D. Esman, James Dexter, Irl. N. Duling and David G. Cooper and having Navy Case No. 75,937 and entitled "A Polarization-Stable Laser," and Cooper et al., "Widely Tunable Polarization-Stable Fiber Lasers," IEEE Jnl of Selected Topics in Quantum Electronics," vol 1, No. 1, pp. 14–21, which references are incorporated herein by reference, describe polarization stable cw lasers in which the gain medium can be made of single-mode optical fiber. Light passes through the gain medium in both directions, each direction having an orthogonal polarization state to the other. The light passing in opposite directions, especially through the gain medium, remains orthogonal because of reciprocal birefringence. Such lasers are not ideal for providing passive mode-locking because of "$\chi_3$ nonlinearity". As the light intensity changes, the index of refraction changes, and so the polarization state evolves differently for light of differing intensity propagating through the fiber. Therefore, light passing through the gain medium in opposite directions does not necessarily have orthogonal polarization with respect to each other, and polarization-selecting elements in the lasers mentioned above will reject light not in that orthogonal polarization state. The advantages of this design for cw lasers are not fully utilized in passive mode-locking lasers.

SUMMARY OF THE INVENTION

It is an object of this invention to provide a pulsed laser.

It is another object of this invention to provide a mode-locked pulsed laser for generating coherent light having a stable and known state of polarization.

It is another object of this invention to provide an active-passive, active or passive mode-locked pulsed laser for generating coherent light having a stable and known state of polarization.

It is another object of this invention to provide a mode-locked pulsed laser which is a fiber device.

It is still another object of this invention to provide a pulsed laser using a single-mode fiber amplifying medium in which the laser is independent of environmental perturbations to the amplifying medium.

The above objects can be accomplished by a pulsed laser which includes a polarization section having a port, the polarization section being for receiving light at the port in a selected state of polarization and for outputting light at the port having a state of polarization orthogonal to the selected state of polarization. The laser also includes an amplifying section having a port, a bidirectional amplifier, and a rotator-reflector, the amplifying section being for receiving light at the amplifying section port and for outputting light at the amplifying section port amplified with respect thereto, the bidirectional amplifier being operatively coupled to the amplifying section port at a first end and operatively coupled to the rotator-reflector at a second end. The pulsed laser further includes means for transmitting light in both directions between the polarization section port and the amplifying section port, an amplitude modulator responsive to a modulation signal for actively mode-locking light internal to the pulsed laser, and means responsive to light internal to the polarization section for outputting coherent light.

In a preferred embodiment, the pulsed laser further includes a bidirectional switching section for altering the polarization state of light passing therethrough so as to provide passive mode-locking.

These and other objects, features and advantages of the present invention are described in or apparent from the following detailed description of preferred embodiments.

BRIEF DESCRIPTION OF THE DRAWINGS

The preferred embodiments will be described with reference to the drawings, in which like elements have been denoted throughout by like reference numerals, and wherein:

FIG. 6, composed of FIGS. 6(a) and 6(b), shows the parameters of the pulse produced by the laser of FIG. 4.

FIG. 8, composed of FIGS. 8(a) and 8(b), shows the parameters of the pulse produced by the laser of FIG. 4 into which the elements of FIG. 7 have been incorporated.

FIG. 10, composed of FIGS. 10(a), 10(b), and 10(c), shows alpha, chi and iota configurations of a pulsed laser for active-passive mode-locking, the laser having a modulator in the amplifying section.

FIG. 11, composed of FIGS. 11(a), 11(b), and 11(c), shows alpha, chi and iota configurations of a pulsed laser for active-passive mode-locking.

FIG. 12, composed of FIGS. 12(a) and 12(b) shows alpha and chi configurations of a pulsed laser for active-passive mode-locking.

DETAILED DESCRIPTION OF THE PREFERRED EMBODIMENTS

Figure 1:
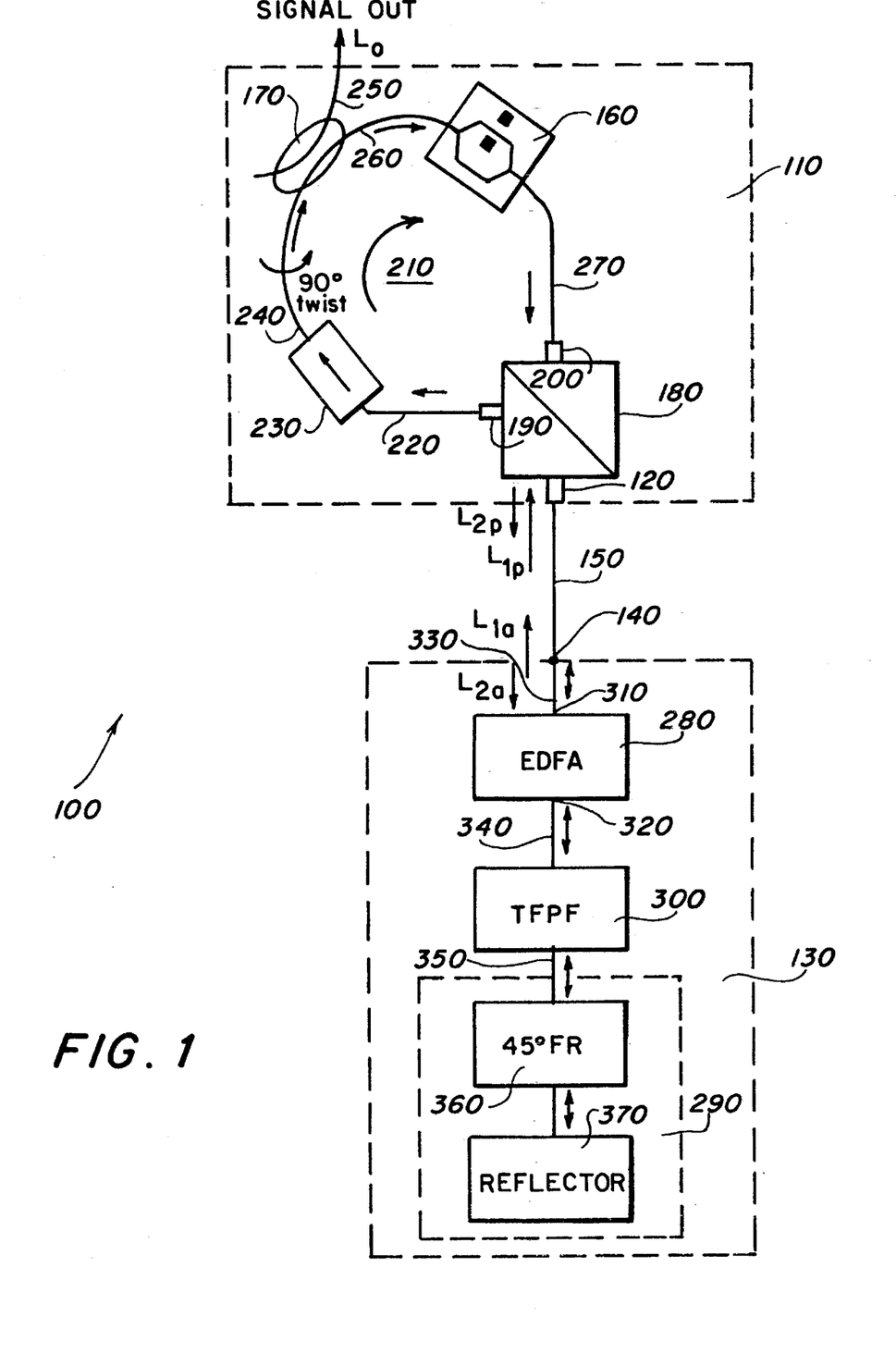
FIG. 1 shows a sigma pulsed laser for active mode-locking.

Referring now to the drawings, FIG. 1 shows a "sigma" configuration 100 of a fiber pulsed laser with a mechanism for active mode-locking. The invention described herein is not necessarily limited to fiber optical components. The active mode-locking sigma laser 100 includes a polarization section 110 having a port 120, an amplifying section 130 having a port 140, and transmission means 150 for transmission of light in both directions between polarization section port 120 and amplifying section port 140. Transmission means 150 is preferably a single-mode fiber. The sigma laser 100 also includes a two-port amplitude modulator 160 responsive to a modulation signal $S_M$, preferably a periodic electrical signal, and most preferably a pulsed signal, for actively mode-locking light internal to the pulsed laser 100, and output means 170, preferably a polarization-maintaining coupler, responsive to light internal to the pulsed laser 100 for outputting coherent light $L_o$. Although not absolutely necessary for the practice of this invention, the modulator 160 and output means 170 are preferably each operatively in the polarization section 110 so as to stabilize the polarization state of the output signal $L_o$.

For the moment, the effects of the modulator 160 will be ignored. The modulator 160 will be treated as a passive polarization-maintaining means for transmission of light. Sigma laser 100 without such a modulator 160 can operate as a continuous wave laser, and the principles of operation of such a cw sigma laser are described in U.S. Pat. No. 5,303,314 to Duling, III, supra, U.S. patent application filed Apr. 28, 1995 by Esman, (Navy Case No. 75,937), supra, and Cooper et al., IEEE Jnl. of Selected Topics in Quantum Electronics, supra. Furthermore, for purposes of this discussion, "polarization state" in the polarization section 110 refers to linearly polarized light, but the invention is not necessarily limited to linearly polarized light.

The polarization section 110 is preferably constructed of polarization-maintaining components and means for transmission. The polarization section port 120 is for receiving light $L_{1p}$ in a selected first polarization state and for outputting light $L_{2p}$ polarized orthogonal to the first polarization state. Since, as discussed below, the transmission means 150 and amplifying section 130 returns light $L_{1p}$ with polarization state predominantly orthogonal to light $L_{2p}$, therefore light $L_{1p}$ received by the polarization section 110 is in the first polarization state, light $L_{2p}$ output by the polarization section 110 is in the second polarization state, and light $L_{1p}$ and $L_{2p}$ have orthogonal states of polarization.

The polarization section 110 includes a beamsplitter 180, preferably a linear polarization beamsplitter, having at least ports 120, 190 and 200. The port 120 of the beamsplitter 180 serves as the port 120 of the polarization section 110, but the two ports could be distinct ports of the polarization section 110, in which case polarization-maintaining transmission means would be used to transmit light in both directions between the port of the polarization section 110 and the port of the beamsplitter 180. An exemplary beamsplitter 180 has insertion loss less than 1 dB and polarization-mode crosstalk less than −25 dB.

The beamsplitter 180 passes that component of the light $L_{1p}$ applied to the port 120 having the selected first polarization state, for example, vertical linear polarization, to the port 190. The beamsplitter 180 passes that component of the light $L_{1p}$ applied to the port 120 having a second polarization state, for example, horizontal linear polarization, to the port 200. The first and second states are orthogonal.

The polarization section 110 further includes a ring 210 for unidirectional transmission of light from port 190 to port 200 so that light received by the ring 210 from port 190 and light transmitted to port 200 by the ring 210 have orthogonal polarization states. The light received at port 190 has substantially the same state of polarization as light $L_{1p}$ received at port 120, and light $L_{2p}$ output at port 120 has substantially the same state of polarization as light transmitted to port 200 by the ring 210, and thus has polarization state orthogonal to light $L_{1p}$.

Port 190 is a polarization-maintaining port operatively coupled by polarization-maintaining fiber 220 to an isolator 230 for receiving light from fiber 220 and passing light to a polarization-maintaining fiber 240. The isolator 230 blocks light from propagating in the opposite direction. Substantially no light passes from fiber 240 to fiber 220 by way of the isolator 230. The isolator 230 is preferably polarization-maintaining, polarization independent, has an insertion loss of less than 1 dB, polarization mode crosstalk less than −25 dB, and a rejection ratio of greater than +50 dB.

The other end of the fiber 240 (from the end coupled to the isolator 230) is operatively coupled to a polarization-maintaining coupler 170 having at least polarization-maintaining arms 240, 250 and 260, arm 240 being for input of light to the coupler 170, and arms 250 and 260 being for output of light from the coupler 170 responsive to light input at arm 240. An exemplary output coupler 170 has excess insertion loss less than 0.5 dB, polarization mode crosstalk less than −20 dB and is designed to output 20% of the light and on arm 250 and pass 80% of the light on arm 260. The fiber 240 is coupled to the isolator 230 and the output coupler 170 in such a manner that the light output from the isolator 230 by fiber 240 and the light input to the coupler 170 by fiber 240 have orthogonal polarization state. The fiber 240 could have a 90° twist in it, it could include a 90° polarization-maintaining/polarization-maintaining splice, or include a 90° Faraday rotator. Therefore, the light received at the coupler 170 from fiber 240 has orthogonal polarization state with respect to the light passed from port 190 to the isolator 230, which in turn has the same polarization state as the light $L_{1p}$ received at port 120.

The light output from arms 250 and 260 of the coupler 170 has orthogonal polarization state with respect to the polarization state of light $L_{1p}$ entering the polarization section 110 at port 120. The light output from the coupler 170 at arm 250 constitutes the output light $L_o$ of the laser 100. Light $L_o$ is coherent light with a definite, known and stable polarization state.

The other end of the fiber 260 (from the end coupled to the coupler 170) is coupled to the modulator 160 which, for now, is treated as passive polarization-maintaining transmission means. The other end of the modulator 160 (from the end coupled to the fiber 260) is a polarization-maintaining fiber 270 coupled to the port 200 for transmission of light between the modulator 160 and port 200. Therefore, the light transmitted to port 200 by the fiber 270 has the same polarization state as the light transmitted by the fiber 260 to the modulator 160, which in turn, has polarization state orthogonal to the light output at port 190 of the beamsplitter.

Since the polarization state of light $L_{2p}$ is the same as the polarization state of light received at port 200 from the ring 210, and the polarization state of light received at port 190 by the ring 210 is the same as the polarization state of light $L_{1p}$ received at port 120, therefore light $L_{1p}$ and light $L_{2p}$ have orthogonal polarization states.

Light output from port 200 of the beamsplitter 180 has the second polarization state, orthogonal to the polarization state of light $L_{1p}$ input to port 120. The former light is blocked by the isolator 230. Accordingly, the ring 210 is for unidirectional transmission of light from port 190 to port 200 so that light transmitted from port 190 and light transmitted to port 200 by the ring 210 have orthogonal polarization states. Port 190 is an output port of the beamsplitter 180, fiber 220 provides input to the isolator 230, and fiber 240 provides transmission from the isolator 230 to the coupler 170. The modulator 160 is operatively coupled to the coupler 170 for transmission from arm 260 of the coupler to the modulator 160, and operatively coupled to port 200 of the beamsplitter 180.

The polarization section 110 may be varied as known to persons of ordinary skill in the art so as to accomplish the above objectives. The isolator 230, coupler 170 and modulator 160 may be in a different order, the 90° twist or splice may be in other places and other means may be used, so long as the isolator 230, coupler 170 and modulator 160 are serially operatively coupled, and so long as the ring 210 serves to receive light of the same polarization state as light $L_{1p}$ from port 190 and output light with orthogonal polarization state to port 200. FIG. 1 is a symbolic representation and is not intended to limit the invention to any particular design of components, such as the beamsplitter 180. For example, the ring 210 could be designed to transmit light from port 200 to port 190. A wavelength filter (not shown) may be included in the ring 210 or it may be placed elsewhere in the laser 100.

The sigma laser 100 also includes an amplifying section 130 with a port 140 for receiving light $L_{2a}$ and outputting light $L_{1a}$. The amplifying section 130 is designed to output light $L_{1a}$ having a state of polarization orthogonal to light $L_{2a}$ and amplified with respect thereto regardless of the polarization state of light $L_{2a}$ received by the amplifying section 130. Transmission means 150, for example, single-mode fiber, is for transmitting light in both directions between the polarization section 110 and the amplifying section 130.

The amplifying section 130 includes a bidirectional amplifier 280 and a rotator-reflector 290, the latter being for returning light with orthogonal polarization to the state of polarization of light input to it. The amplifier 280 and rotator-reflector 290 are serially operatively coupled, and the amplifying section 130 optionally includes a bidirectional wavelength filter 300, operatively coupled between the amplifier 280 and the rotator-reflector 290 in the amplifying section 130. The wavelength filter 300 preferably has low back reflection and can be fixed or tunable, for example a tunable 1535–1565 nanometer (nm) Fabry-Perot filter, having filter bandwidth of 5 nm and insertion loss of less than 2 dB.

The amplifier 280 has two ports, 310 and 320. The amplifier 280 is operatively coupled to the amplifying section port 140 by transmission means 330 for transmission of light in both directions between ports 140 and 310, and operatively coupled to the wavelength filter 300 by transmission means 340 for transmission of light in both directions between port 320 and the wavelength filter 300.

The optional wavelength filter 300 is operatively coupled to the amplifier 140 by transmission means 340, and operatively coupled to the rotator-reflector 290 by transmission means 350 for transmission of light in both directions between the wavelength filter 300 and the rotator-reflector 290.

Transmission in the amplifying section 130, such as by transmission means 330, 340 and 350 is preferably provided by single-mode transmission means, such as single-mode fiber. As with the polarization section 110, the components of amplifying section 130 need not be optical fiber components, and transmission need not be by optical fiber. However, the invention is designed to address problems inherent in bidirectional amplifying media sensitive to environmental stress, as single-mode fiber with gain is.

An exemplary amplifier 280 is a commercial Nd:YLF-pumped ytterbium-erbium fiber amplifier with a maximum small signal gain of 30 dB and a saturated output power of 22 dBm at 1565 nm. The fiber amplifier can alternatively be doped with other ions, such as erbium, neodymium, holmium, and thulium (and therefore can operate at other wavelengths), can be a solid-state rather than a fiber gain medium, and can be pumped by other means, such as by a diode-laser or ion-laser.

Embodiments of such an amplifying section 130 are described in U.S. Pat. No. 5,303,314 to Duling, supra, U.S. patent application filed Apr. 28, 1995 by Esman, (Navy Case No. 75,937), supra, and Cooper et al., IEEE Jnl. of Selected Topics in Quantum Electronics, supra. In an embodiment shown in FIG. 1, the rotator-reflector 290 includes a 45° Faraday rotator 360 in series with a reflector 370, an exemplary rotator-reflector having rotation of ±45° each pass, 1.5° rotation tolerance, and insertion loss less than 1 dB. The rotator-reflector 290 can be implemented as a single unit conventional Faraday rotator and mirror combination 290.

Conventional optical fibers, such as the single-mode fibers preferably used in transmission means 150, 330, 340 and 350 and in amplifier 280, exhibit reciprocal birefringence. Because of this property, light propagating in opposite directions with orthogonal polarization states remain in orthogonal polarization states with respect to each other regardless of slow variations in the fiber birefringence. Variations in the fiber birefringence are preferably on a time scale slower than the round trip time through the transmission means 150 and the amplifying section 130.

As a specific example for linearly polarized light throughout the laser 100, and considering only linear propagation (polarization evolution being independent of intensity) in the amplifier 280 the light is propagated in opposite directions with orthogonal polarization states at all locations on transmission means 150 and in the amplifying section 130, including port 140 because of the "unwinding" effect in single-mode fibers. This property is further discussed in U.S. patent application filed Apr. 28, 1995 by Esman, (Navy Case No. 75,937), supra. This simplified analysis applies equally well to arbitrary elliptically polarized light. Therefore, light $L_{1a}$ output by the amplifying section 130 and light $L_{2a}$ received by the amplifying section 130 have orthogonal polarization states, light $L_{1p}$ received by the polarization section 110 and light $L_{2p}$ output by the polarization section 110 have orthogonal polarization states, and light $L_{1p}$ received by the polarization section 110 has the selected first polarization state.

Therefore, transmission difficulties such as interfering modes and other distortions resulting from birefringence are substantially reduced or eliminated. Moreover, the need for other conventional polarization treatment devices in the optical signal path (such as polarization controllers) are eliminated. The fiber optic amplifier 280 may be straightforwardly constructed of readily obtained non-polarization-maintaining fiber, reducing cost and complexity.

The above analysis applies equally well to transmission means 150, 330, 340 and 350 being polarization-maintaining means, such as polarization-maintaining fiber or bulk transmission.

The above-described sigma laser 100 is a traveling wave double pass linear laser (except for part of the polarization section 110 which is unidirectional) for producing light with stable and known polarization state. In the double pass parts, light passing in opposite directions has orthogonal polarization state, and so does not introduce spatial hole burning, polarization-mode competition, polarization gain dependence, or environmentally-induced noise or instabilities due to birefringence variations. Therefore, sigma laser 100 is not subject to polarization instability.

The effect of the modulator 160 will now be considered. An exemplary modulator 160 is an integrated $LiNbO_3$ Mach-Zehnder amplitude modulator with a 10 gigahertz (GHz) bandwidth. Other types of modulators, such as acousto-optic, bulk electro-optic, or phase modulator, could equally well be used, as could modulators which are polarization-independent, and modulators which are not fiber modulators. A modulation signal $S_M$, preferably an electrical pulse, is applied to the modulator 160 to control the repetition rate of laser 100 by active mode-locking. Upon application of the pulse $S_M$, the modulator 160 outputs light in fiber 270 which has a nonzero amplitude when the pulse is on, and which has a substantially reduced amplitude when the pulse is off. An example of the modulation signal $S_M$ is an electrical signal with a period of 2 nanoseconds (ns) and pulse duration of 100 picoseconds (ps). In order for the device 100 to effectively produce a coherent pulse output $L_o$, the round trip time of light through the cavity of the laser 100 is the period or an integral multiple of the period of the timing signal For example, a 500 megahertz (MHz) oscillator producing 100 ps pulses can actively mode-lock laser 100 with a repetition rate corresponding to 390 pulses circulating in the cavity. Another example of the modulation signal $S_M$ is a 10 GHz sine wave, biased to turn the modulator on and off at a 10 GHz rate.

Referring to FIG. 1, the polarization section 110 can in general have other configurations as discussed further below, which configurations preferably include polarization-maintaining components and transmission means, polarization means, a modulator, and an output mechanism responsive to light transmitted internally in the polarization section 110. The output light $L_o$ is coherent, polarization-stable, and pulsed as determined by the modulation signal $S_M$. The modulator and output mechanism can each be in other parts of the laser 100, but the output light will not necessarily be as polarization-stable.

Figure 2:
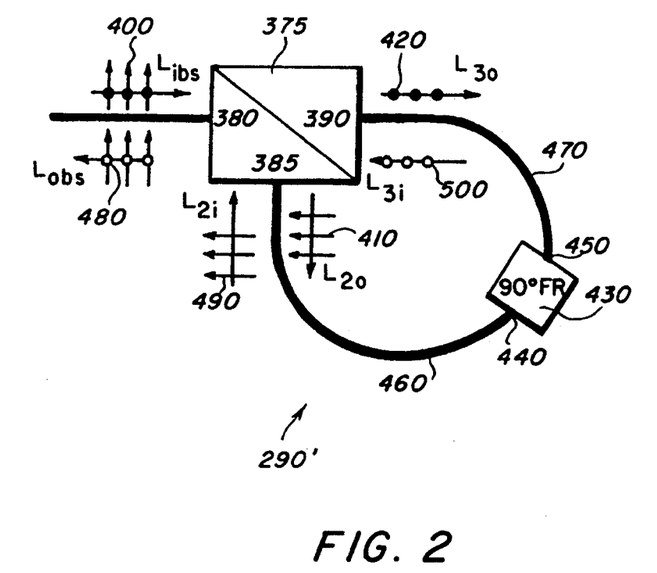
FIG. 2 shows a rotator-reflector using a beamsplitter.

Referring now to FIG. 2, an alternative design for the rotator-reflector 290' uses a beamsplitter 375, having at least ports 380, 385 and 390. The beamsplitter 375 is preferably a polarization beamsplitter, such as fiber optic splitter/combiner model FOBS-22P-1111-SSPP-1300-PBS-45 from OZ Optics Ltd., Corp. The beamsplitter 375 could also be of any type known to persons skilled in the art, such as bulk or fused fibers, so long as it has the properties set forth below.

The beamsplitter 375 is responsive to light $L_{ibs}$ selectively applied to port 380 and to light selectively applied to ports 385 and 390 as described below. The light $L_{ibs}$ need not have any particular state of polarization 400 as it reaches the port 380. The polarization state 400 of the light $L_{ibs}$ as it reaches the beamsplitter 375 shown at any particular instant may be arbitrary. It can vary unpredictably over time. The rotator-reflector 290' is insensitive to the polarization state 400.

The beamsplitter 375 passes that component of the light $L_{ibs}$ applied to the port 380 having a first polarization state, for example, vertical linear polarization, to the port 385. The beamsplitter 375 passes that component of the light $L_{ibs}$ applied to the port 380 having a second polarization state, for example, horizontal linear polarization, to the port 390. The first and second states are orthogonal but otherwise arbitrary.

The light $L_{2o}$ which the beamsplitter 375 passes from the port 380 to the port 385 has polarization state 410, and the light $L_{3o}$ which the beamsplitter 375 passes from the port 380 to the port 390 has polarization state 420.

The rotator-reflector 290' further includes a bidirectional nonreciprocal rotator, preferably a 90° Faraday rotator 430 having ports 440 and 450, and transmission means 460 and 470 for propagating light in both directions between ports 385 and 440, and for propagating light in both directions between ports 420 and 450, respectively. Transmission means 460 and 470 are preferably polarization-maintaining means, such a polarization-maintaining fiber, and are preferably oriented so the light primarily propagates on the fiber axes, and not off-axis.

The beamsplitter 375 passes that component of the light $L_{2i}$ applied to the port 385 which has the first polarization state to the port 380. The beamsplitter 375 also passes that component of the light $L_{3i}$ applied to the port 390 which has the second polarization state to the port 380. The light the beamsplitter 375 passes to the port 380 is the light $L_{obs}$ and has polarization state 480. It is a combination of the light $L_{2i}$ applied to the port 385 having the first polarization state and the light $L_{3i}$ applied to the port 390 having the second polarization state. The polarization state 480 of light $L_{obs}$ is influenced by the relative amplitude and phase of light $L_{2i}$ and $L_{3i}$ applied to ports 385 and 390, respectively, and is orthogonal to the polarization state 400 of light $L_{ibs}$ applied to the port 380 of the beamsplitter 290'. For linear input polarization state 400, the output polarization state 480 is the polarization state 400 rotated by ±90° and propagates in the opposite direction, so polarization states 400 and 480 are orthogonal. For example, if the polarization state 400 is linear vertical, then the polarization state 480 will be linear horizontal. The rotator-reflector 290' returns orthogonal light $L_{obs}$ for any arbitrary input polarization state 400.

Figure 3:
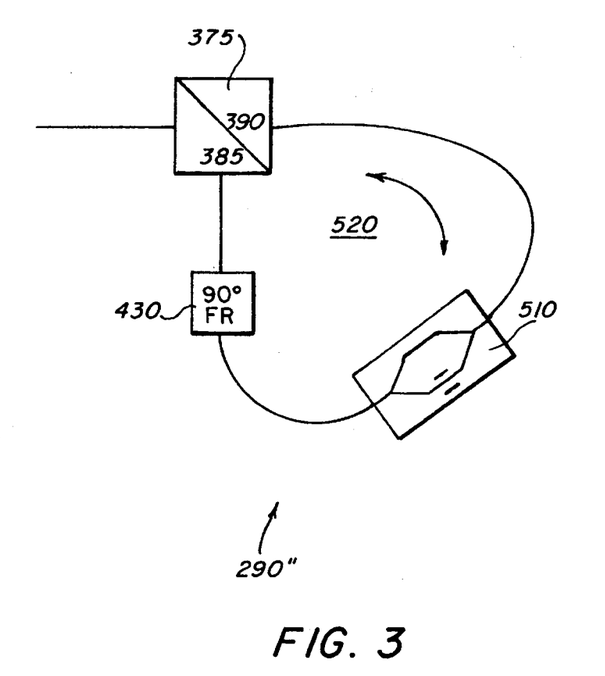
FIG. 3 shows a rotator-reflector using a beamsplitter and having a modulator.
Figure 9:
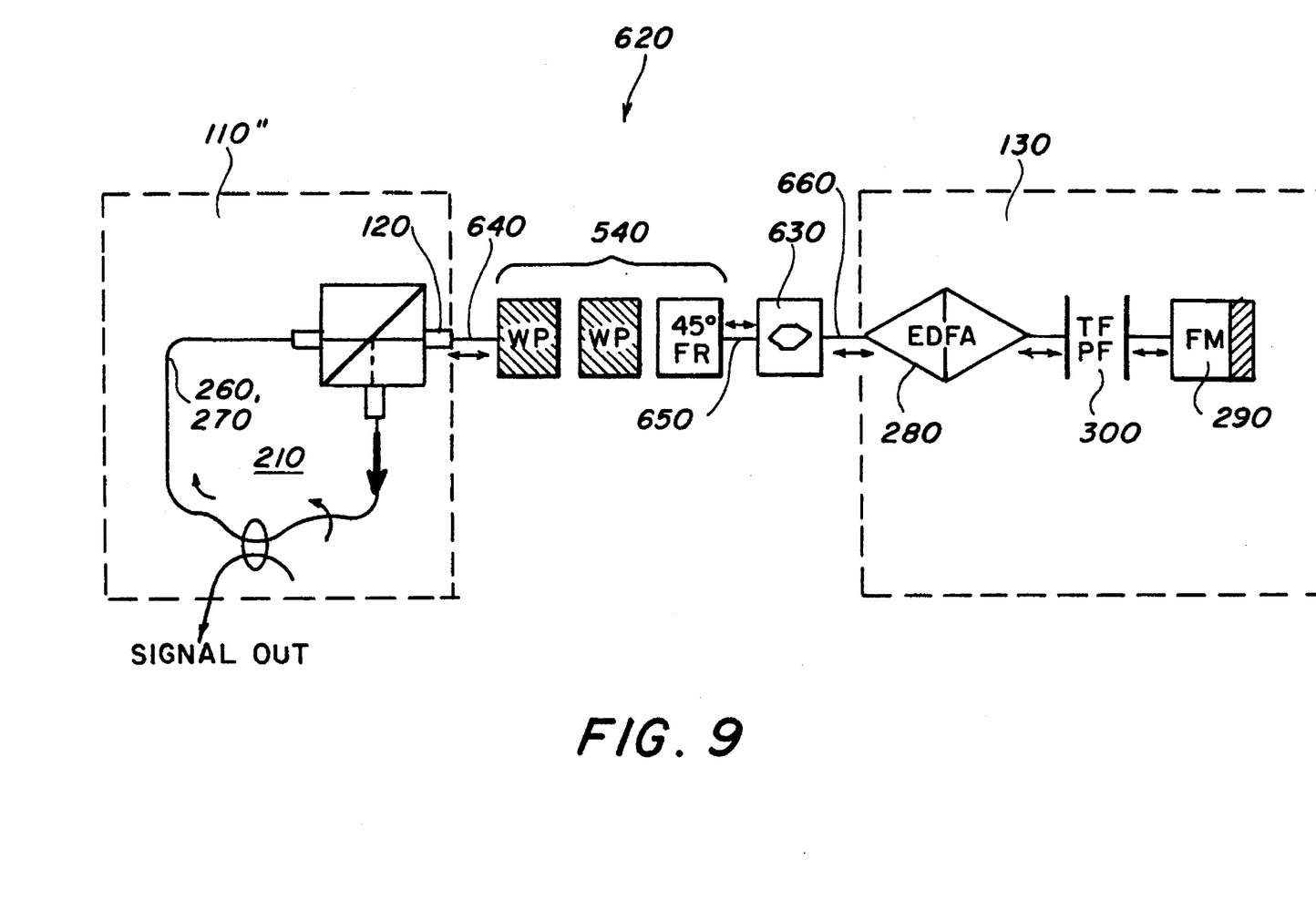
FIG. 9 shows a sigma pulsed laser for active-passive mode-locking.
Figure 10A:
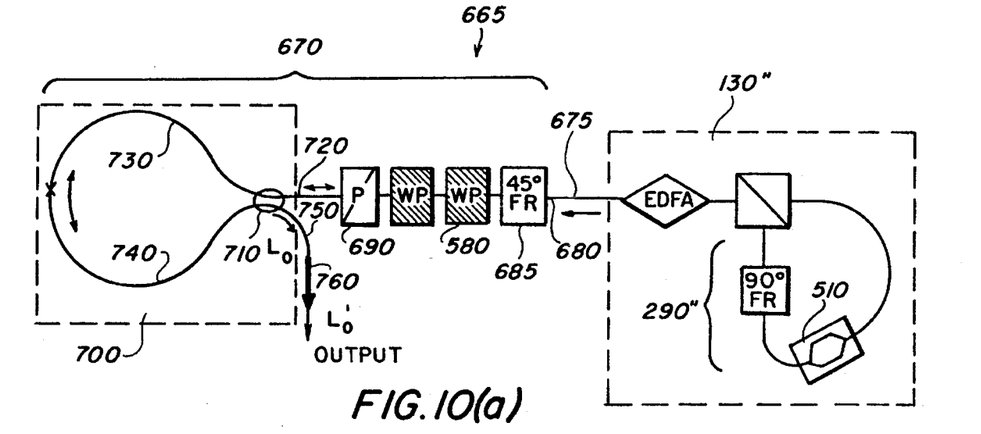
Figure 10B:
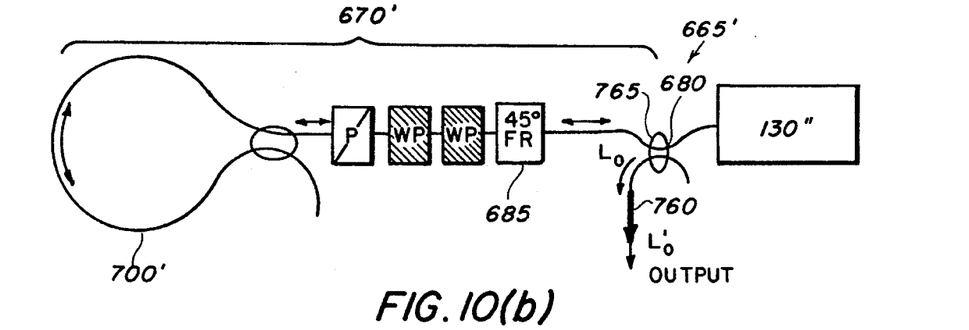
Figure 10C:
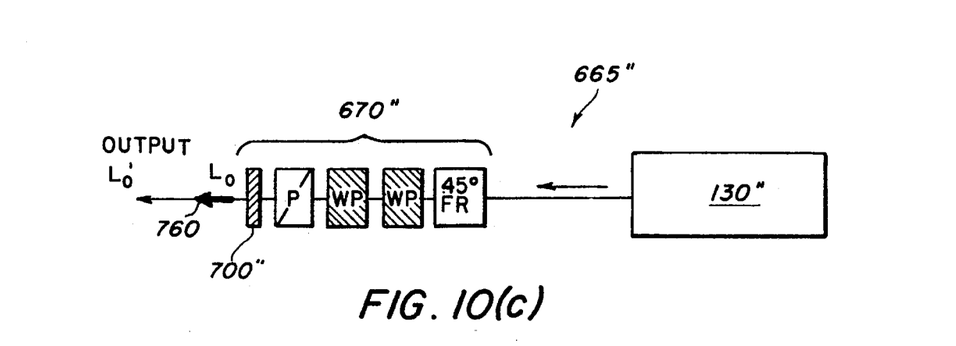

Referring now to FIGS. 3 and 10, another embodiment of the rotator-reflector 290" in the amplifying section 130" includes a bidirectional modulator 510 disposed in the exact center of the loop 520, the loop 520 consisting of all optical elements, including the rotator 430, between ports 385 and 390 of the beamsplitter 375, but not including the beamsplitter 375. The modulator 510 is operatively coupled between ports 385 and 390 of the beamsplitter 375 and is responsive to timing signal $S_M$. The modulator 510 is disposed in the timing center of the loop 520, which is a location where counterpropagating pulses cross each other. Since in general there will be more than one pulse propagating in the loop 520, the modulator 510 does not have to be rigorously placed in the exact center of the loop 520. It can be placed anywhere that two counterpropagating pulses cross each other. In general, placing the modulator 510 at a pulse crossing limits the bandwidth of the modulator 510 to the inverse of the modulator 510 transit time unless counter-propagating velocity matched electrical waveforms are used to drive the modulator 510. Designs with this feature are preferred since they have wider bandwidth. The modulator 510 is preferably a polarization-maintaining modulator, for example, a pigtailed bulk modulator. Referring now to FIGS. 1, 3 and 9, for a sigma pulsed laser 100 (not shown) including this rotator-reflector 290" the modulator 160 can be omitted from the polarization section resulting in polarization section 110". In such an embodiment (not shown), transmission means 260 and 270 can be spliced end to end or replaced by a single fiber (not shown).

Figure 4:
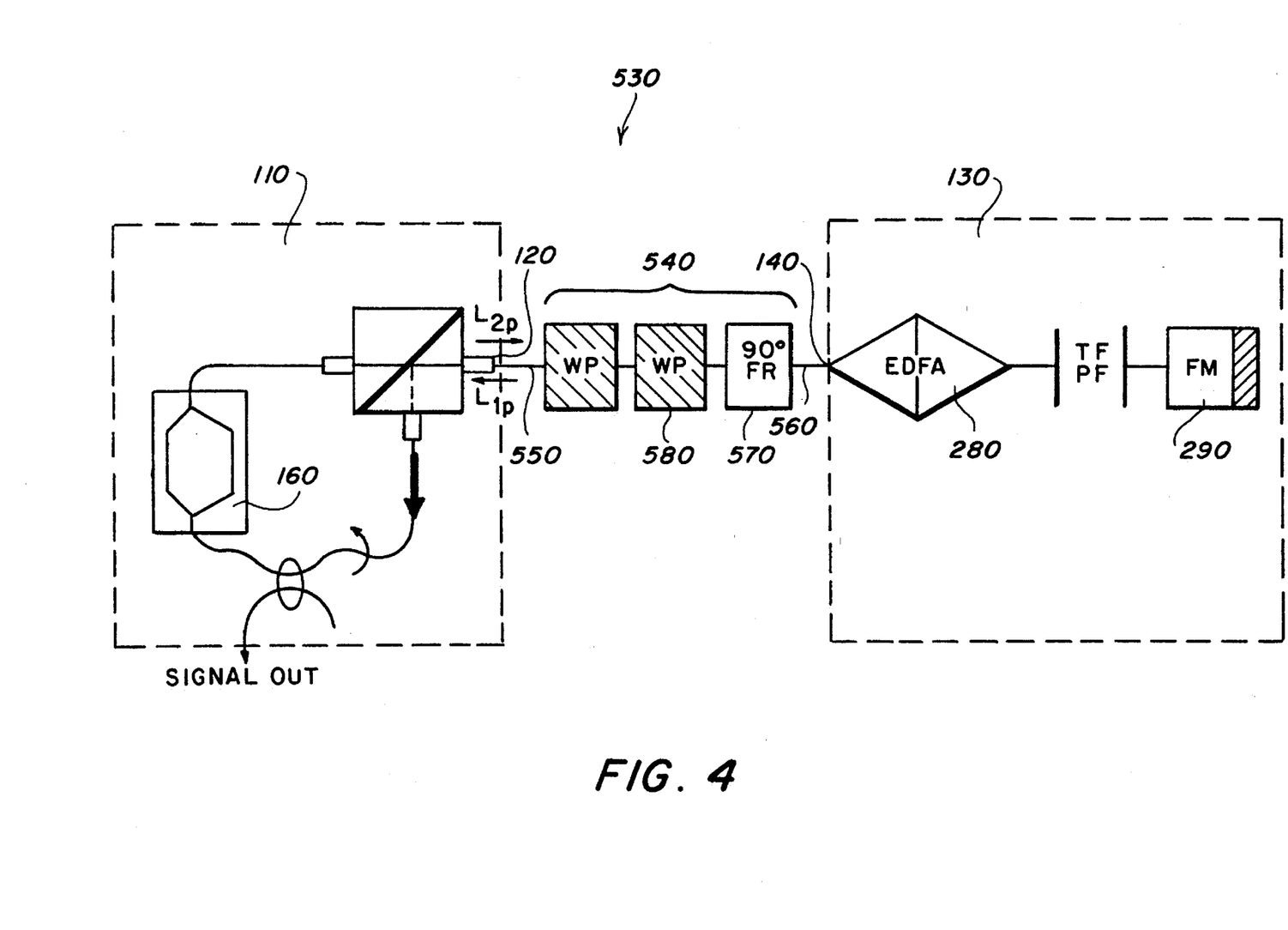
FIG. 4 shows a sigma pulsed laser for active-passive mode-locking.

Referring now to FIG. 4, a sigma pulsed laser 530 with active-passive mode-locking includes a bidirectional switching section 540 operatively coupled between the polarization section 110 and the amplifying section 130. The switching section 540 is operatively coupled to polarization section port 120 by transmission means 550 for transmission in both directions between the switching section 540 and port 120, and operatively coupled to amplifying section port 140 by transmission means 560 for transmission in both directions between the switching section 540 and port 140. Transmission means 550 is preferably polarization-maintaining fiber, and transmission means 560 is preferably single-mode fiber. The switching section 540 along with transmission means 550 and 560 constitutes transmission means 150 (FIG. 1).

The switching section 540 includes a bidirectional non-reciprocal rotator 570, preferably a 45° Faraday rotator, but other types of rotators 570, such as variable Faraday rotators, could equally well be used. The switching section 540 optionally includes one or more waveplates 580 serially coupled to the rotator 570. The optical path from the polarization section port 120 to the rotator 570 is preferably polarization-maintaining. The switching section 540 can be bulk, in which case it can be readily integrated into the laser 530 with GRIN lenses.

For linearly propagating light, the polarization of light $L_{1p}$ entering the polarization section 110 is no longer predominantly in the selected first polarization state, but is predominantly in the second polarization state, and therefore is blocked in the polarization section 110. The above analysis of the polarization section 110 does not apply to the extent that the light $L_{1p}$ received by the polarization section 110 is not substantially in the first polarization state, and the light passed from the beamsplitter 180 to the ring 210 by port 190, having the first polarization state, does not have the same polarization state as light $L_{1p}$. Light $L_{1p}$ and $L_{2p}$ are no longer orthogonal with respect to each other. Less light will pass through the polarization section 110 for output as light $L_{2p}$ having the second polarization state.

Because of the $\chi_3$ nonlinearity in single-mode fiber, polarization state of light with differing intensity may evolve differently. As a first order approximation, this nonlinear intensity-dependent rotation of the polarization state may be expanded as:

$$|\Delta p(I(t))| = |\Delta p_{NL} \cdot I(t)|, \quad (1)$$

where $\Delta p_{NL}$ is proportional to the nonlinear refractive index and $I(t)$ is the intensity envelope of the pulse. Because of this nonlinear effect, higher intensity light will return to the polarization section 110 as light $L_{1p}$ with polarization state that is no longer predominantly in the second polarization state, a larger proportion of it will be in the first polarization state, and a larger proportion of it will be passed through the polarization section 110 for output as light $L_{2p}$.

The one or more waveplates 580, can be adjusted to provide polarization bias optimal for the polarization section 110 selecting the nonlinearly polarization rotated portion of the pulse. The one or more waveplates 580 can be adjusted to optimize the disparity in net gain between linearly propagating, lower intensity light and nonlinearly propagating, higher intensity light. The one or more waveplates 580 are preferably bulk birefringent waveplates. Alternatively, the one or more waveplates 580 can consist of a single-mode fiber polarization controller.

Figure 5:
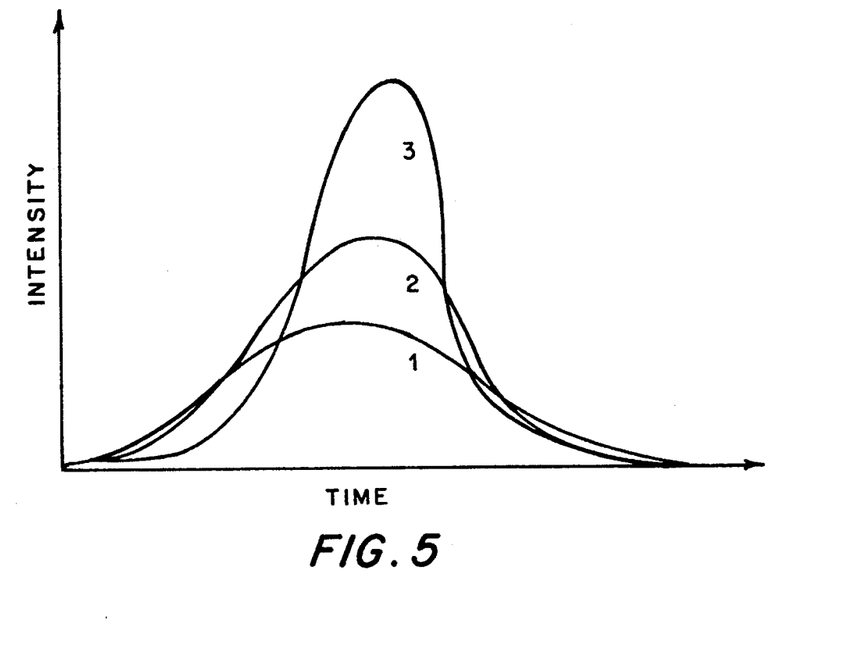
FIG. 5 shows the time-evolution of a pulse as a result of passive mode-locking.

Referring now to FIG. 5, the principle of passive mode-locking is seen in terms of successive passes of a pulse through the laser 530. On pass "1", the pulse is relatively broad and of relatively low peak intensity. On successive passes "2" and "3," the pulse is progressively narrowed as its peak intensity is increased, since higher intensity light has a higher net gain than lower intensity light.

Figure 6A:
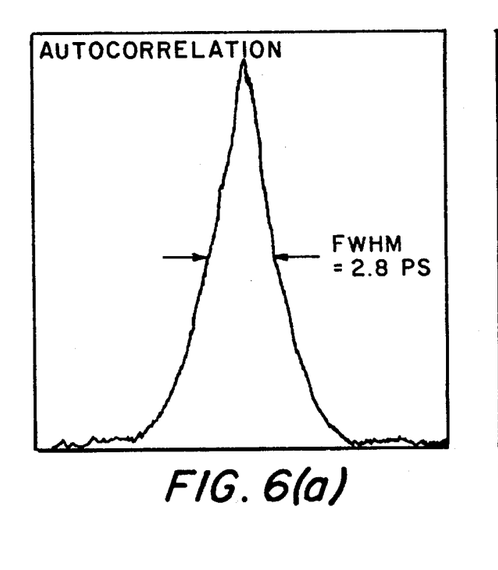
Figure 6B:
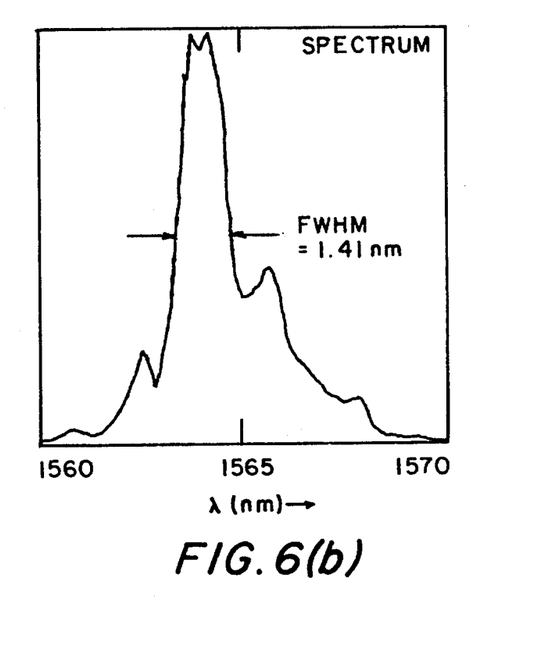

Referring now to FIG. 6, composed of FIGS. 6(*a*) and 6(*b*), a representation of a pulse produced by the sigma laser 530 of FIG. 4 is shown. As shown in FIG. 6(*a*), the autocorrelation of the output light $L_o$, corresponding to the time-waveform of a pulse, based on a modulation signal $S_M$ (FIG. 4) with period 2 ns and 100 ps pulses, has full width at half maximum of 2.8 ps and the spectrum (FIG. 6(*b*)) has full width at half maximum of 1.41 nm.

Figure 7:
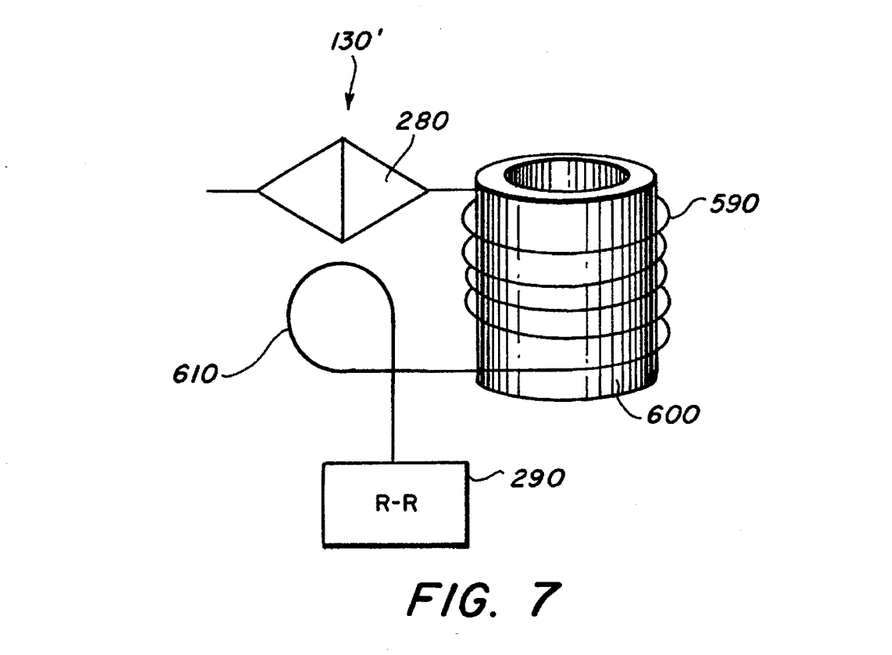
FIG. 7, shows an amplifying section with laser length-adjusting and dispersion-compensating mechanisms.

Referring now to FIG. 7, an amplifying section 130' includes length-adjusting and dispersion-compensating mechanisms. 45 meters (m) of dispersion-shifted (5 ps/(nm-km)) fiber 590 is wound on a piezoelectric cylinder 600, such as a PZT cylinder, in series with 10 m of nominally −85 ps/(nm-km) normal-dispersion fiber 610 and operatively coupled between the amplifier 280 and the rotator-reflector 370. The PZT coil 590–600 is part of a feedback loop (not shown) for stabilizing the laser cavity length with respect to the driving frequency of the driving signal $S_M$ (FIG. 4). The feedback loop adjusts the optical length so that the transit time of a pulse through the laser 100 (FIG. 1) or 530 (FIG. 4) is and remains an integral multiple of the timing signal period despite drift or slow variation in fiber length. Alternatively, the frequency of the timing signal $S_M$ or the operating wavelength of the laser could be adjusted by feedback. Another feature of this design is that the fiber 590 provides a sufficient length of fiber for the $\chi_3$ optical nonlinearity to significantly develop. The length adjusting mechanism 590–600 could be inserted in the polarization section 110 using polarization-maintaining fiber 590.

The normal-dispersion fiber 610 partly compensates the overall dispersion of the laser 100 or 530, allowing it to produce briefer pulses.

Figure 8A:
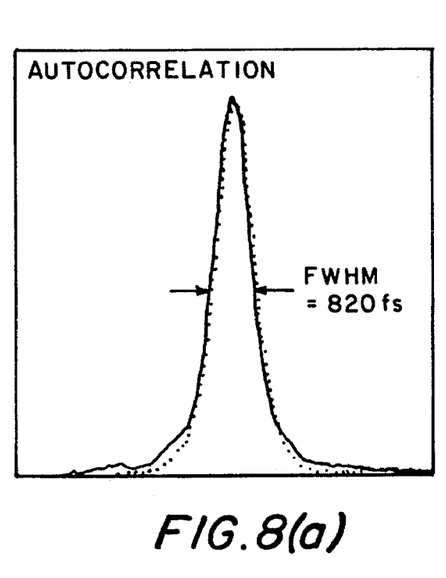
Figure 8B:
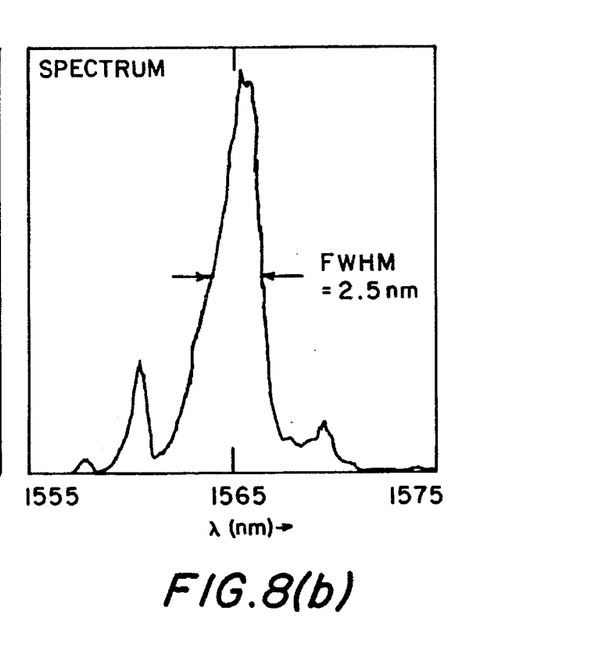

Referring now to FIG. 8, composed of FIGS. 8(*a*) and 8(*b*), a representation of a pulse produced by the sigma laser 530 of FIG. 4 using amplifying section 130' of FIG. 7 is shown. As shown in FIG. 8(*a*), the autocorrelation of the output light $L_o$, corresponding to the time-waveform of a pulse, based on a modulation signal $S_M$ (FIG. 4) with period 2 ns and 100 ps pulses, has full width at half maximum of 820 fs. The autocorrelation is closely fit by the hyperbolic secant squared function. The spectrum of this pulse (FIG. 8(*b*)) has full width at half maximum of 1.41 nm. Comparing FIG. 8 with FIG. 6, it can be seen that the amplifying section 130' (FIG. 7) serves to reduce the pulse width by about a factor of 3 over the amplifying section 130 (FIG. 4).

The above-described active mode-locking pulsed laser 100 and active-passive mode-locking pulsed laser 530 are described in T. F. Carruthers et al., "Active-Passive Mode Locking in a Single-Polarization Erbium Fiber Laser," Presented at Conference on Lasers and Electro-Optics, 1994, OSA Technical Digest Series (Optical Society of America, Washington, D.C. 1994) postdeadline paper CPD11, 12 May 1994, and T. F. Carruthers et al., "Active-Passive Modelocking in a Single-Polarization Erbium Fibre Laser," Electronics Letters, Vol. 30, No. 13, pp. 1051–1053 (23 Jun. 1994), which references are incorporated herein by reference.

In an alternative (not shown), the switching section 540 could be placed in the amplifying section 130 next to the rotator-reflector 290 or between the Faraday rotator 360 and reflector 370 (FIG. 1). The switching section 540 and rotator-reflector 290 could be fabricated as a single integrated unit, thus reducing the number of components and making the laser 530 more economical, although such a laser 530 might not be as polarization-stable. The dispersion compensating mechanism of FIG. 7, including the dispersion-shifted fiber 590 wound on the PZT cylinder 600, and the normal dispersion fiber 610, would be operatively coupled between the amplifier 280 and the switching section 540.

Two embodiments of a sigma pulsed laser for active mode-locking have been described: one with a modulator 160 in the polarization section 110 (FIG. 1), and another with a modulator 510 in the amplifying section 130" (FIG. 3) and not in the polarization section 110" (FIG. 9). As discussed above, insertion of a switching section 540 (FIG. 4) provides the former embodiment with a passive mode-locking mechanism. The switching section 540 could equally well be inserted in the latter embodiment between the polarization section 110" and the amplifying section 130" to provide the laser with a passive mode-locking mechanism. Similarly, the amplifying section 130' including length-adjusting and dispersion-compensating mechanisms shown in FIG. 7 could be used in either embodiment of a sigma active-mode-locking laser or a sigma active-passive mode-locking laser.

Referring now to FIG. 9, an embodiment of a sigma active-passive mode-locking pulsed laser 620 has a bidirectional modulator 630 responsive to timing signal $S_M$ which could be external to both the polarization section 110" and the amplifying section 130. As with the embodiment in which the modulator 510 is internal to the amplifying section 130" (FIGS. 3 and 10), the polarization section 110" does not necessarily include a modulator 160 (FIG. 1).

The laser 620 includes a switching section 540 and the bidirectional modulator 630 serially operatively coupled between the polarization section 110" and the amplifying section 130. The switching section 540 is operatively coupled to polarization section port 120 by transmission means 640 for transmission in both directions between the switching section 540 and port 120, and operatively coupled to one end of the modulator 630 by transmission means 650 for transmission in both directions between the switching section 540 and the modulator 630. The other end of the modulator 630 (from transmission means 650) is operatively coupled to the amplifying section 130 by transmission means 660 for transmission in both directions between the modulator 630 and the amplifying section 130. Transmission means 640 and 650 are preferably polarization-maintaining fiber, and transmission means 660 is preferably single-mode fiber.

The modulator 630 is preferably a polarization independent modulator, for example, a pigtailed bulk modulator. It is disposed in the exact center of the laser 620, which is a location where counterpropagating pulses cross each other. Since in general there will be more than one pulse propagating in the laser 620, the modulator 630 does not have to be rigorously placed in the exact center of the laser 620. The modulator 630 can be placed anywhere that two counter-propagating pulses cross each other, even in the polarization section 110" or amplifying section 130". Transmission internal to the laser 620 is bidirectional except for in the unidirectional ring 210 of the polarization section 110". The bidirectional modulator 630 could equally effectively be placed elsewhere in the laser 620 where there is bidirectional transmission, so long as it is at a location where counter-propagating pulses cross one another. It could even be operatively coupled internal to the polarization section 110" between the polarization section 110" and the switching section 540, or internal to the amplifying section 130 at such locations. As with modulator 510 (FIG. 3), in general, placing the modulator 630 at a pulse crossing limits the bandwidth of the modulator 630 to the inverse of the modulator 630 transit time unless counter-propagating velocity matched electrical waveforms are used to drive the modulator 630. Designs with this feature are preferred since they have wider bandwidth.

The bidirectional modulator 630 is inserted in series with other components, partially replacing the relevant transmission means between components. For example, it could be inserted between the polarization section 110" and the switching section 540, between the amplifier 280 and the optional wavelength filter 300, or between the Faraday rotator 360 and the reflector 370 if the rotator-reflector 290 is so designed. Whether the transmission means on both sides of the bidirectional modulator 630 is preferably polarization-maintaining or single-mode depends on where the modulator 630 is placed and what type of transmission means it is replacing. For example, if the modulator 630 is inserted between the polarization section 110" and the switching section 540, the transmission means on both sides of it are preferably polarization-maintaining. Furthermore, if the modulator 630 replaces polarization-maintaining transmission means, it is preferably a polarization-maintaining modulator.

Just as with the laser 530 (FIG. 4), laser 620 operates as an active-passive mode-locked pulsed sigma laser. The switching section can be omitted and replaced with bidirectional transmission means for transmission of light in both directions between the polarization section 110" and the modulator 630. Fibers 640 and 650 could be spliced end-to-end or replaced with a single polarization-maintaining fiber. Such a laser (not shown) would be an active mode-locked sigma laser. In other embodiments (not shown), the modulator 160 (FIGS. 1, 4), 510 (FIG. 3), 630 (FIG. 9) could be omitted from the laser 100, 530, 620 and replaced with suitable transmission means. Such a laser (not shown) would produce pulses by the passive mode-locking mechanism.

Referring to FIGS. 1, 3, 4 and 9, a sigma pulsed laser includes a polarization section 110 and an amplifying section 130. Active mode-locking embodiments have been described in which a modulator 160, 510 or 630, responsive to a modulations signal $S_M$, is in the polarization section 110, in the amplifying section 130" or in a bidirectional location where counter-propagating pulses cross one another. A switching section 540 inserted between the polarization section 110 and the amplifying section 130" provides the laser with passive mode-locking so as to narrow the optical pulse.

The above-described embodiments are not limited to the sigma configuration but may be extended to include "alpha," "chi," and , "iota" configurations described for cw lasers in U.S. patent application filed Apr. 28, 1995 by Esman, (Navy Case No. 75,937), supra, and Cooper et al., IEEE Jnl. of Selected Topics in Quantum Electronics, supra.

Referring now to FIG. 10, composed of FIGS. 10(a), 10(b), and 10(c), the alpha, chi, and iota configurations of an active-passive mode-locking pulsed laser 665, 665' and 665" include a polarization section 670, 670' or 670" respectively, and an amplifying section 130". As described earlier, the amplifying section 130" includes a bidirectional modulator 510 responsive to a timing signal $S_M$. The laser 665 also includes transmission means 675, preferably single-mode fiber, for transmission of light in both directions between the polarization section port 110" and the amplifying section 130".

For a passive mode-locking laser 665, the polarization section 670 includes a port 680 for input and output of light, a bidirectional 45° Faraday rotator, one or more bidirectional waveplates 580, a bidirectional polarizer 690, and a reflector 700, operatively coupled serially and in that order. The polarization section 670 is preferably constructed of polarization-maintaining components and means for transmission of light internal to the polarization section. The laser 665 also includes means responsive to light internal to the polarization section 670 for outputting coherent light.

The alpha configuration 665 (FIG. 10(a)), chi configuration 665' (FIG. 10(b)), and iota configuration 665" (FIG. 10(c)) differ primarily in the reflector 700 and the output mechanism.

Referring now to FIG. 10(a), in the alpha configuration 665, the reflector 700 is a fiber loop mirror, and preferably a variable-reflecting polarization-maintaining fiber loop mirror utilizing a polarization-maintaining variable coupler 710 having polarization-maintaining arms 720, 730, 740 and 750. The arm 720 provides transmission in both directions between the mirror 700 and the polarizer 690. Polarization-maintaining arms 730 and 740 are spliced together with axes aligned (0°) to each other. Arm 750 provides output light $L_o$, which is preferably transmitted to an isolator 280 for providing laser output light $L_o'$.

Referring now to FIG. 10(b), in the chi configuration 665' the reflector is a fiber loop mirror 700' providing near total reflection. Output is provided by a polarization-maintaining output coupler 765, one port of which constitutes the polarization section port 680, an opposite port of which is operatively coupled to the rotator 685, and another port of which (either or both of the 2 remaining ports) provides output light $L_o$. An exemplary output coupler 680 is a polished block, polarization-maintaining variable coupler with a 1 dB insertion loss.

Referring now to FIG. 10(c), in the iota configuration 665" the reflector is a partially reflecting mirror 700". Part of the light incident on the mirror 700" is passed through as output light $L_o$.

Referring to FIG. 10, composed of FIGS. 10(a), 10(b), and 10(c), if the one or more waveplates 580 were removed and replaced by polarization-maintaining transmission means, such as polarization-maintaining fiber, the laser (not shown) would operate as an active mode-locked pulsed laser. Light would be received by the polarization section 670 at port 680 in the selected polarization state (the first polarization state) and light responsive thereto would be output by the polarization section 670 at port 680 with the second polarization state orthogonal to the first polarization state. The polarization section 670 does not produce light responsive to any component of the input light which is not in the first polarization state. The transmission means 675 and amplifying section 130" return light with orthogonal polarization state, in particular, the first polarization state.

In the active-passive mode-locking laser 665, one or more waveplates are preferably operatively coupled between the polarizer 690 and the rotator 685.

For linearly propagating light, the polarization of light entering the polarization section 670 at port 680 is no longer predominantly in the selected first polarization state, therefore is somewhat blocked in the polarization section 670. The above analysis of the polarization section 670 does not apply to the extent that the light received by the polarization section 670 at port 680 is not substantially in the first polarization state. Light received by the polarization section 670 at port 680 and output by the polarization section 670 at port 680 are no longer orthogonal with respect to each other. Less light will pass through the polarization section 670 for output having the second polarization state.

Because of the $\chi_3$ nonlinearity in single-mode fiber, the polarization state of light with differing intensity may evolve differently. Because of this nonlinear effect, higher intensity light will return to the polarization section 670 at port 680 with a larger proportion of in the first polarization state, and a larger proportion of it will be pass through the polarization section 670 for output.

As with the sigma configurations, the one or more waveplates 580, preferably bulk birefringent waveplates, can be adjusted to provide polarization bias optimal for the polarization section 670 selecting the nonlinearly polarization rotated portion of the pulse. The one or more waveplates 580 can be adjusted to optimize the disparity in gain between linearly propagating, lower intensity light and nonlinearly propagating, higher intensity light.

Figure 11A:
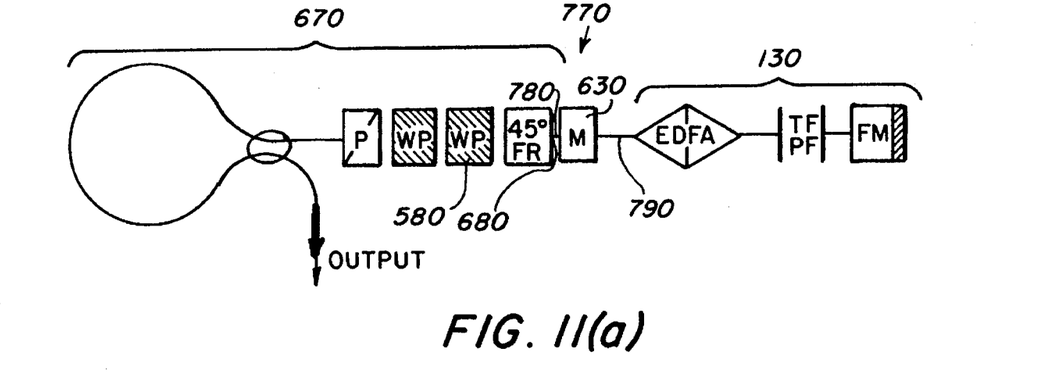
Figure 11B:
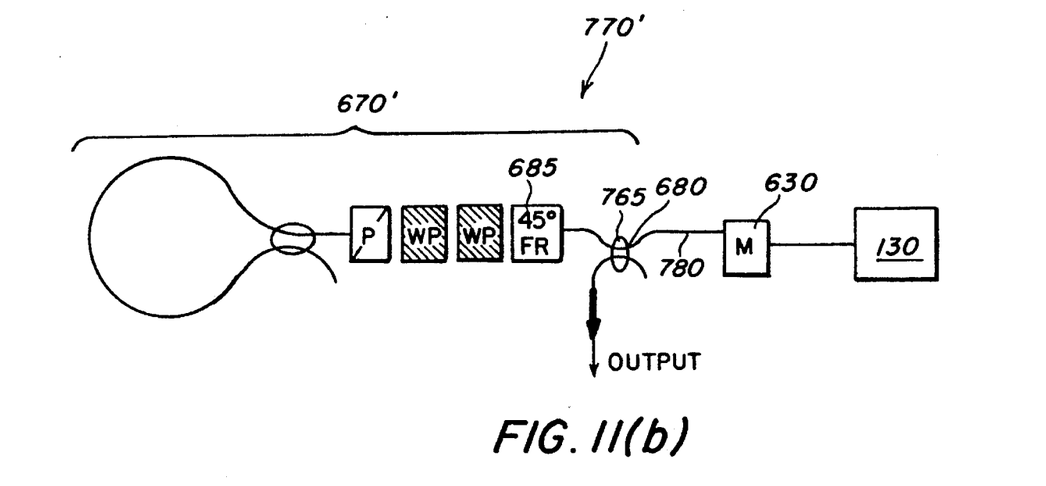
Figure 11C:
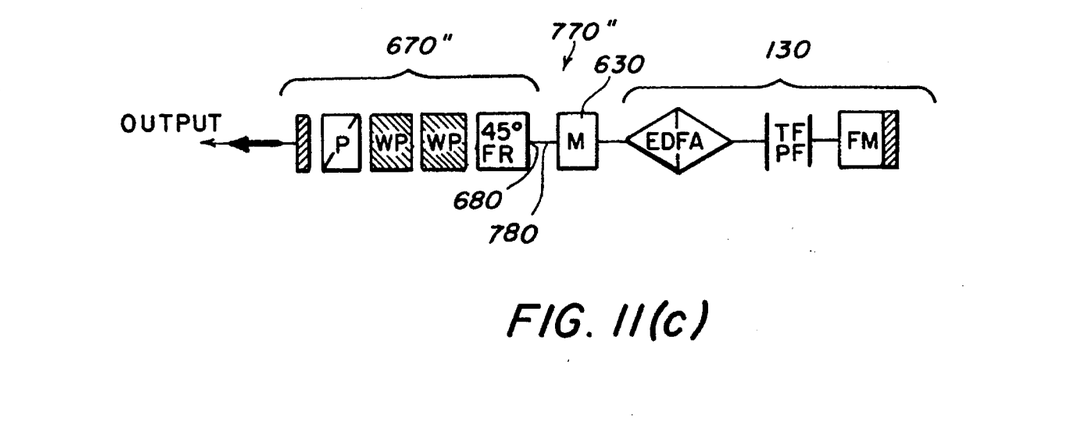

Referring now to FIG. 11, composed of FIGS. 11(a), 11(b), and 11(c), the alpha, chi, and iota configurations of an active-passive mode-locking pulsed laser 770, 770' and 770" include a bidirectional modulator 630 responsive to a timing signal $S_M$ which modulator 630 could be external to both the polarization section 670 and the amplifying section 130. The polarization section 670 and amplifying section 130 are as described above.

The bidirectional modulator 630 is operatively coupled serially between the polarization section 670 and the amplifying section 130. One end of the modulator 630 is operatively coupled to polarization section port 680 by transmission means 780 for transmission in both directions between the modulator 630 and port 680. The other end of the modulator 630 (from transmission means 780) is operatively coupled to the amplifying section 130 by transmission means 790 for transmission in both directions between the modulator 630 and the amplifying section 130. Transmission means 780 and 790 are preferably single-mode fiber.

As with the embodiment shown in FIG. 9, the modulator 630 is preferably a polarization independent modulator, for example, a pigtailed bulk modulator, and is disposed where counterpropagating pulses cross each other, even in the polarization section 670 or amplifying section 130, preferably in the exact center of the laser. Transmission internal to the laser 770 is bidirectional. The bidirectional modulator 630 could equally effectively be placed elsewhere in the laser 770 where there is bidirectional transmission, so long as it is at a location where counterpropagating pulses cross one another. It could even be operatively coupled internal to the polarization section 670 or the amplifying section 130 at such locations.

The bidirectional modulator 630 is inserted in series with other components, partially replacing the relevant transmission means between components. For example, in the chi configuration 770' (FIG. 11(b)), the modulator 630 could be between the coupler 765 and the Faraday rotator 685. Whether the transmission means on both sides of the bidirectional modulator 630 is preferably polarization-maintaining or single-mode depends on where the modulator 630 is placed and what type of transmission means it is replacing. For example, if the modulator 630 is inserted in the polarization section 670, the transmission means on both sides of it are preferably polarization-maintaining. Furthermore, if the modulator 630 replaces polarization-maintaining transmission means, it is preferably a polarization-maintaining modulator 630. could be a polarization-dependent modulator, such as an integrated LiNbO$_3$ Mach-Zehnder amplitude modulator with a 10 GHz bandwidth. Other types of modulators, such as acousto-optic, bulk electro-optic, or phase modulator, could equally well be used, as could modulators which are polarization-independent, and modulators which are not fiber modulators. If the modulator 630 replaces single-mode transmission means, it is preferably a polarization-dependent modulator.

Just as with the laser 530 (FIG. 4), laser 620 (FIG. 9), and laser 665 (FIG. 10), laser 770 operates as an active-passive mode-locked pulsed sigma laser. The one or more waveplates 580 can be omitted and replaced with bidirectional, preferably polarization-maintaining transmission means for transmission of light in both directions between the polarizer 690 and the Faraday rotator 685. Such a laser (not shown) would be an active mode-locked sigma laser. Just as with the sigma laser, in other embodiments (not shown), the modulator 510 (FIG. 10, 12), 630 (FIG. 11) could be omitted from the laser 665, 770, 800 and replaced with suitable transmission means. Such a laser (not shown) would produce pulses by the passive mode-locking mechanism.

Figure 12A:
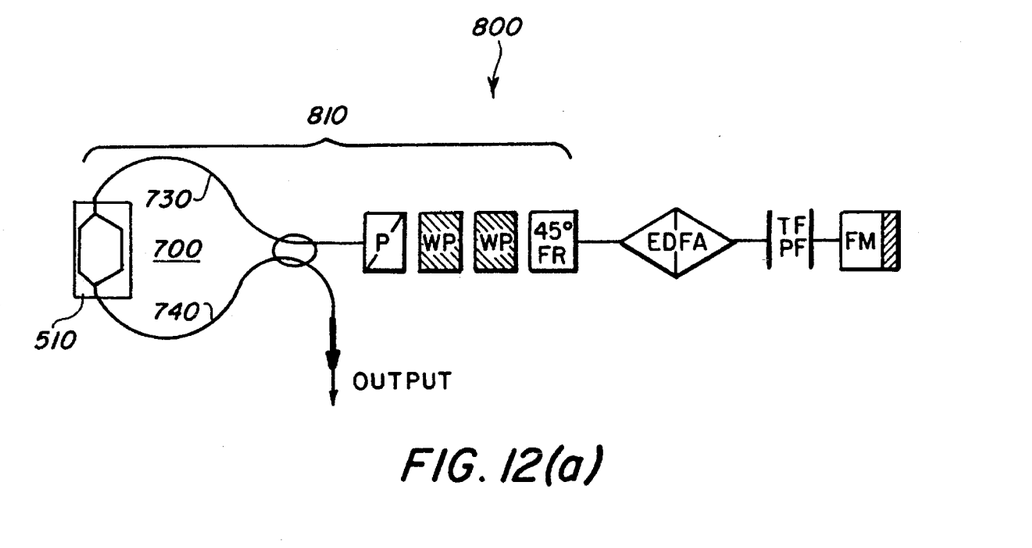
Figure 12B:
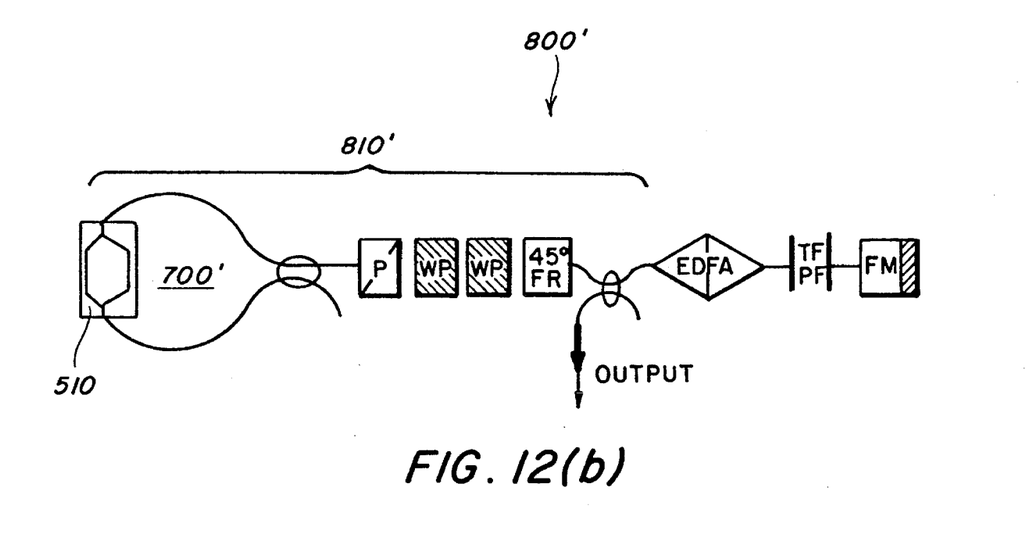

Referring to FIGS. 10(*a*) and 10(*b*), the alpha and chi configurations 665 and 665' respectively, each have a fiber loop mirror 700. Referring now to FIG. 12, composed of FIGS. 12(*a*) and 12(*b*), active-passive mode-locked pulsed lasers 800 and 800' in the alpha and chi configurations, respectively, include each include a bidirectional modulator 510 disposed in the fiber loop mirror 700 in the polarization section 810. The modulator 510 is operatively coupled between arms 730 and 740 of the fiber loop mirror 700 and is responsive to timing signal $S_M$. The modulator 510 is disposed at a location in the fiber loop mirror 700 where two counterpropagating pulses cross each other, such as in the exact center. The modulator 510 is preferably a polarization-maintaining modulator. In all respects other than location of the modulator, the alpha laser 800 is the same as alpha lasers 665 and 700, and the chi laser 800' is the same as chi lasers 665' and 700'.

The foregoing descriptions of the preferred embodiments are intended to be illustrative and not limiting. It will be appreciated that numerous modifications and variations can be made without departing from the spirit or scope of the present invention.

What is claimed is:

1. A pulsed laser comprising:
   (a) a polarization section having a port, said polarization section being for receiving light at said port in a selected state of polarization and for outputting light at said port having a state of polarization orthogonal to the selected state of polarization;
   (b) an amplifying section having a port, a bidirectional amplifier, and a rotator-reflector, said amplifying section being for receiving light at said amplifying section port and for outputting light at said amplifying section port amplified with respect thereto, said bidirectional amplifier being operatively coupled to said amplifying section port at a first end and operatively coupled to said rotator-reflector at a second end;
   (c) means for transmitting light in both directions between said polarization section port and said amplifying section port;
   (d) an amplitude modulator responsive to a modulation signal for actively mode-locking light internal to said pulsed laser; and
   (e) means responsive to light internal to said polarization section (a) for outputting coherent light.

2. The pulsed laser of claim 1 further comprising a bidirectional switching section for altering the polarization state of light passing therethrough so as to provide passive mode-locking.

3. The pulsed laser of claim 1, said polarization section being of the configuration selected from the class consisting of sigma, alpha, chi, and iota.

* * * * *